United States Patent [19]

Moberly et al.

[11] 4,234,710

[45] Nov. 18, 1980

[54] CATALYST AND A POLYMERIZATION PROCESS EMPLOYING THE CATALYST

[75] Inventors: Charles W. Moberly; Melvin B. Welch; Lawrence M. Fodor, all of Bartlesville, Okla.

[73] Assignee: Phillips Petroleum Company, Bartlesville, Okla.

[21] Appl. No.: 703,473

[22] Filed: Jul. 8, 1976

Related U.S. Application Data

[63] Continuation-in-part of Ser. No. 598,965, Jul. 24, 1975, abandoned.

[51] Int. Cl.$^3$ .............................................. C08F 4/02
[52] U.S. Cl. ................................ 526/125; 252/429 B; 526/114; 526/351; 526/906
[58] Field of Search ............ C08F/10/06; 252/429 B, 252/429 C; 526/114, 125, 142, 903

[56] References Cited

U.S. PATENT DOCUMENTS

| | | | |
|---|---|---|---|
| 2,981,725 | 4/1961 | Luft et al. | 526/125 |
| 3,238,146 | 3/1966 | Hewett et al. | 526/125 |
| 3,278,511 | 10/1966 | Langer | 526/903 |
| 3,642,746 | 2/1972 | Kashiwa et al. | 526/125 |

FOREIGN PATENT DOCUMENTS

| | | |
|---|---|---|
| 2230672 | 12/1972 | Fed. Rep. of Germany . |
| 2347577 | 5/1974 | Fed. Rep. of Germany . |
| 800447 | 8/1958 | United Kingdom . |
| 885869 | 12/1961 | United Kingdom . |
| 1128724 | 10/1968 | United Kingdom . |
| 1335887 | 10/1973 | United Kingdom . |

*Primary Examiner*—Edward J. Smith

[57] ABSTRACT

Alpha olefins are polymerized employing a catalyst which forms on mixing a first component resulting from admixture of a halogenated titanium compound and a magnesium or manganese halide; a second component which is an organoaluminum compound; a third component which is a Lewis base; and a fourth component which is an organoaluminum monohalide.

26 Claims, No Drawings

CATALYST AND A POLYMERIZATION PROCESS EMPLOYING THE CATALYST

This is a continuation-in-part of copending application Ser. No. 598,965, filed July 24, 1975, now abandoned.

BACKGROUND

The present invention relates to a catalyst, a method for making the catalyst and a polymerization process employing the catalyst.

In the field of catalytic polymerization of olefins such as propylene to produce useful solid polymers, a continuing objective is to increase productivity. By productivity is meant the amount of useful solid polymer that is obtained by means of a given quantity of catalytic materials. This is important because the removal of catalytic materials from the solid polymer is almost always necessary and is generally troublesome or expansive to carry out. Thus, improved polymerization processes are desired in which the productivity of the polymer per unit of catalyst material is so great that the amount of catalyst residues remaining in the polymer is insignificant and the catalyst removal steps can be minimized or omitted.

One known catalyst system which is said to exhibit a relatively high productivity employs two components wherein the first component is prepared from materials such as titanium tetrachloride, ethyl benzoate, and magnesium chloride and the second component is prepared from materials such as triethylaluminum and ethyl anisate. Such a catalyst system is said to produce large quantities of solid polymer per unit of catalyst.

It is known that an improvement in the type of catalyst represented above is alleged by the incorporation of a solid organic material into the first component which is inert to the catalyst component. An example of such a material is durene. The incorporation of a material such as durene is said to improve the stereospecific nature of the catalyst and provide yet a higher yield of usable polymer per unit of catalyst.

The present invention provides still higher yields of usable polymer per unit of catalyst as compared to the above known catalysts.

SUMMARY

In accordance with the invention, a catalyst is provided which forms on mixing a first component resulting from the admixture of a halogenated bivalent, trivalent, or tetravalent titanium compound, and a compound selected from the group consisting of magnesium and manganese dihalide; a second component wherein said second component is a compound selected from the group consisting of a trialkylaluminum compound and an organoaluminum compound having 2 or more aluminum atoms bonded to one another by an oxygen or a nitrogen atom; a third component wherein said third component is a Lewis base; and a fourth component wherein said fourth component is an organoaluminum monohalide represented by the general formula $AlR_2X$ wherein the R groups represent alkyl radicals having from 1 to about 12 carbon atoms, said R groups being the same or different, and X represents a halogen atom.

Further, in accordance with the invention, alpha-olefins are polymerized under polymerization conditions employing the above catalyst.

Further, in accordance with the invention, a catalyst is prepared by mixing a first component resulting from the admixture of a halogenated bivalent, trivalent or tetravalent titanium compound, and a compound selected from the group consisting of magnesium and manganese dihalide; a second component selected from the group consisting of a trialkylaluminum compound and an organoaluminum compound having 2 or more atoms bonded to one another by an oxygen or a nitrogen atom; a third component, said third component being a Lewis base; and a fourth component, said fourth component being an organoaluminum monohalide represented by the general formula $AlR_2X$ wherein the R groups represent alkyl radicals having from 1 to about 12 carbon atoms, said R groups being the same or different, and X represents a halogen atom.

DETAILED DESCRIPTION OF THE INVENTION

A broad range of olefins can be polymerized by the process and catalyst system of the present invention. Commercial value can be visualized presently with alpha olefins which have from 2 to about 6 carbon atoms. The invention finds particular usefulness with either ethylene or propylene which is polymerized to produce polyethylene or polypropylene, respectively. Mixtures of the alpha olefins can be used. Very high ratios of polypropylene to catalyst were obtained employing the catalyst and process of the present invention.

The catalyst system of the present invention consists of several essential components. The first component comprises a halogenated bivalent, trivalent or tetravalent titanium compound, and either magnesium or manganese dihalide. These compounds are such that their mixture, when contacted with one or more other catalyst components, produces a product active for olefin polymerization. Regarding the titanium compound, generally titanium tetrahalides are used. As an example, titanium tetrachloride has been used with very good results.

Lewis bases are used in the present invention for the third component of the catalyst and optionally in the first component of the catalyst as described hereinafter. Suitable Lewis bases for use as the third component and in the first component of the catalyst system include organic compounds such as amines, amides, ethers, esters, ketones, nitriles, phosphines, etc. Particularly applicable are esters represented by the formula:

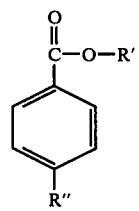

wherein R' represent alkyl groups having from 1 to about 4 carbon atoms and wherein R" represents monovalent radicals selected from the group consisting of —F, —Cl, —Br, —I, —OH, —OR', —OOCR', —SH, —NH$_2$, —NR'$_2$, —NHCOR', NO$_2$, —CN, —CHO, —COR', —COOR', —CONH$_2$, CONR'$_2$, —SO$_2$R', —CF$_3$, and hydrogen. Some examples of such compounds are ethyl benzoate, ethyl anisate (p-methoxybenzoate), ethyl p-dimethylaminobenzoate, ethyl p-fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate and mixtures thereof. The Lewis bases used in the first component and for the third component of the catalyst can be the same or different. Particularly good results were obtained employing ethyl anisate for the third component, ethyl benzoate in the first component and ethyl anisate for the third component, and ethyl benzoate in both the first and third components.

Regarding magnesium dihalide and manganese dihalide, generally magnesium dihalide is used. As an example, very good results were obtained using magnesium dichloride.

The second component comprises a trialkylaluminum compound or an organoaluminum compound having two aluminum atoms bonded one to another by an oxygen or a nitrogen atom. Of the two types of organoaluminum compounds suitable for use in the second component of the catalyst, the trialkylaluminum compounds are generally used. Suitable trialkylaluminum compounds are those corresponding to the general formula AlR$_3$ wherein R represents alkyl groups having from 1 to about 12 carbon atoms. The R groups can be the same or different. Some examples of these compounds are triethylaluminum, trimethylaluminum, tri-n-propylaluminum, triisobutylaluminum, tri(2-ethylhexyl)aluminum, dimethylethyaluminum, tri-n-amylaluminum, tri-n-dodecylaluminum and mixtures thereof. Very good results were obtained employing triethylaluminum.

The organoaluminum compounds with two or more aluminum atoms bonded to one another by an oxygen or a nitrogen atom are usually obtained by the reaction of a trialkylaluminum compound with water, ammonia, or a primary amine in accordance with known processes. Among such suitable compounds are those represented by the following formulas:

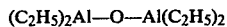

and

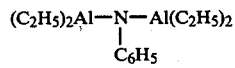

The fourth component of the catalyst is an organoaluminum monohalide. The organoaluminum monohalide compounds which are applicable for use in the present invention are those compounds represented by general formula AlR$_2$X wherein R represents an alkyl group having from 1 to about 12 carbon atoms and wherein X represents a halogen atom. The R groups can be the same or different. The halogens most often used are chlorine and bromine and compounds containing a chloride atom are generally preferred because very good results were obtained using them and they are readily available. Some examples of suitable organoaluminum monohalide compounds are diethylaluminum chloride, dimethylaluminum chloride, methylethylaluminum chloride, diethylaluminum bromide, di-n-propylaluminum chloride, ethyl-t-butylaluminum bromide, di-(2-ethylhexyl)aluminum chloride, diethylaluminum fluoride, di-n-butylaluminum chloride, dimethylaluminum iodide, di-n-dodecylaluminum chloride and mixtures thereof.

Very good results were obtained by employing a catalyst-improving solid organic material as a part of the first component of the catalyst, although it is pointed out that the invention is not limited in scope to the use of such materials. The catalyst-improving solid organic material can be employed whether or not a Lewis base is employed in the first component. The solid organic materials suitable for use in the invention appear to be inert with respect to the second, third and fourth components or compounds used in the invention. Such materials are incorporated into the first component of the catalyst during the preparation of the first component. Although the material is referred to as a solid organic material, as described below, the material is normally in a particulate or pulverized state after it is incorporated in the first component of the catalyst. These materials appear to improve the stereospecificity of the catalyst system and can be either relatively low molecular weight compounds or they can be polymeric materials. Some examples are durene(2,3,5,6-tetramethylbenzene), anthracene, hexachlorobenzene, p-dichlorobenzene, naphthalene, polyvinyltoluene, polycarbonate, polyethylene, polypropylene, polystyrene, polymethylmethacrylate and mixtures thereof. Durene was used in a number of runs and found to be particularly effective.

In the preparation of the first component of the catalyst the halogenated titanium compound, the magnesium dihalide or manganese dihalide, and the Lewis base and/or solid organic material, if used, are blended or mixed in any suitable manner which will provide a finely divided solid material which, when suitably reduced, provides an active catalyst component of the invention. The reducing agent is usually a mixture of the second component and the third component of the catalyst system; however, the second and third components need not be mixed together prior to contacting the other components of the catalyst. Good results were obtained by combining the materials comprising the first component of the catalyst system in a ball-mill, but other grinding means or similar equipment can be used. Further, it is frequently helpful if the magnesium dihalide or manganese dihalide is subjected to a separate grinding operation before mixing it with the other materials making up the first catalyst component and subsequently grinding the mixture as earlier described.

The proportions of the halogenated titanium compound and the Lewis base compound when a Lewis base compound is used are presently not believed to be critical since it is believed that an equimolar complex is formed regardless of the relative amounts used; however, it is recommended that the ratio of titanium compound to Lewis base be in the range of from about 0.7:1 to about 1.3:1. The first catalyst component will generally contain from about 35 to about 65 weight percent magnesium or manganese dihalide, from about 10 to about 60 weight percent solid organic material, if used, and from about 5 to about 25 weight percent of the halogenated titanium compound or the halogenated titanium compound-Lewis base complex. If the solid organic material is not used then the first catalyst component will generally contain from about 50 to about 95 weight percent magnesium or manganese dihalide and from about 5 to about 50 weight percent of the halogenated titanium compound or halogenated titanium compound-Lewis base complex. The first catalyst component can be prepared at any suitable temperature and pressure, ambient temperature generally being used.

It has been found convenient to mix the second and third components together prior to contacting them with the other catalyst components; however, it is understood that the second and third catalyst components can be contacted with the other catalyst components separately if desired. The second catalyst component of the catalyst system comprises an organoaluminum compound (trialkylaluminum compound or the organodialuminum compound) and the third component comprises a Lewis base. The Lewis base can be the same or different from the Lewis base optionally employed in the preparation of the earlier-described first catalyst component. The mixture is prepared by contacting the trialkylaluminum or organodialuminum compound with the Lewis base under any suitable conditions of temperature. The contact can be carried out either in the presence or absence of a diluent but an inert hydrocarbon diluent such as hexane, heptane, and the like is convenient. The quantity of diluent is not critical.

The molar ratio of the organoaluminum compound of the second component to the Lewis base of the third component can be selected over a substantial range depending upon the specific compounds used. Generally, the aluminum compound to Lewis base molar ratio will be in the range of from about 1:1 to about 8:1. As an example, good results were obtained employing a molar ratio of triethylaluminum to ethyl anisate in the range of 1.5:1 to 6.0:1. Normally the mixture of the second and third components of the catalyst is in a liquid state.

If desired, the fourth component of the catalyst system, the $AlR_2X$ compound, can be incorporated into the mixture of the second and third catalyst components by simply mixing, preferably in the presence of a convenient hydrocarbon diluent. Any order of contact can be used to contact the Lewis base, the organoaluminum compound, and the $AlR_2X$ compound. It is presently believed that a desirable complex is formed between the organoaluminum compound of the second catalyst component and the Lewis base of the third catalyst component. The incorporation of the $AlR_2X$ compound into the liquid of the second and third catalyst components can be carried out at any convenient temperature, for example ambient temperature or even at polymerization process temperature.

The conditions for the polymerization process will generally be similar to those well known for related processes using a reduced titanium catalyst system. The process is conveniently carried out in the liquid phase in the presence or absence of a diluent such as an inert hydrocarbon, e.g., n-heptane, isobutane, cyclohexane, etc.; however, it is understood that the invention is not limited to liquid phase reactions. If no diluent is used, then the reaction is carried out in liquid monomer. The polymerization temperature can be selected from a range of temperatures depending upon the specific monomers employed and the mode of reaction, but it will generally be in the range of 60°–212° F. (15.5°–100° C.). As an example, the polymerization of propylene using a liquid propylene phase is conveniently carried out in the range of from about 75° to about 175° F. (24°–80° C.), although it is preferred to employ a temperature in the range of from about 120° to about 160° F. (49°–71° C.) because of better results with regard to productivity and solubles. The polymerization pressure can be any convenient pressure. When a liquid phase reaction is carried out, of course the pressure will be such as to maintain the reactants in the liquid phase within the reaction zone. Control of the molecular weight of the polymer by the presence of small amounts of hydrogen during polymerization is a well-known procedure and can be used to advantage in the present inventive process.

The polymerization process can be carried out continously or batch-wise.

The proportions of the first catalyst component and the second catalyst component in the reaction zone will depend somewhat on the amount of catalyst poisons, such as water and air, etc., present during catalyst preparation and in the polymerization system. Since the second catalyst component, the organoaluminum compound, is the primary catalyst component attacked by such poisons, the amount of the second component required in the invention is that amount inactivated by the poisons plus the amount needed to obtain the increase in productivity. In essentially poison-free systems the molar ratio of the aluminum compound of the second component to the titanium compound of the first component can be as low as on a one-to-one basis. In systems with a high poison level the molar ratio can be several hundred times that of the poison-free system. It has been found that in general the catalyst system of the present invention is relatively insensitive to the ratio of catalyst components, with the exception of reactions carried out in the presence of catalyst poisons as above described. Thus the molar ratio of the aluminum compound of the second component to the titanium compound of the first component can be selected from a wide range. Generally, a molar ratio in the range of from about 1:1 to about 2000:1 is used; however, it is presently recommended that a molar ratio be selected in the range from about 25:1 to about 1500:1. Regarding the molar ratio of the fourth component to the first component, the amount of $AlR_2X$ compound introduced into the reaction zone can also be selected from a broad range of ratios. It is recommended that the molar ratio be such as to provide a $AlR_2X$ to titanium molar ratio in the range from about 0.5:1 to about 2000:1, usually 2:1 to about 1500:1.

All the catalyst components can be individually introduced into the reaction zone or can be combined in various ways. Some of the procedures for introducing the catalyst materials into the reaction zone are: charging the fourth component followed by a premixed slurry of the first, second and third catalyst components; charging the first component followed by the fourth component and monomer then followed by the second component together with the third component flushed in with a liquid solvent or monomer; charging a mixture of the second, third and fourth components followed by liquid propylene and then the first component; charging the first component followed by a portion of monomer and followed by a mixture of the second, third and fourth components flushed with additional monomer.

It has been found that if the catalyst components are mixed together employing a mixing temperature ranging from about −120° F. to about 80° F. (−84° C. to 27° C.), a higher yield of useful polymer is produced per unit of catalyst as compared to the amount of useful polymer produced employing the same catalyst prepared at a mixing temperature of approximately 150° F. (66° C.) and higher. Any order of mixing of the catalyst components can be used and still obtain the higher yield of useful polymer if the recommended range of mixing temperatures is used. It is presently believed desirable not to contact the first component and the fourth component together at temperatures of about 150° F. (66° C.) or higher in the absence of monomer or the second component.

After completion of the polymerization reaction or after a suitable residence time in the reaction zone, the reactor contents are discharged, treated with an agent such as alcohol to inactivate the catalyst system, then the mixture is separated and the polymer isolated and purified by a suitable procedure such as by drying under vacuum. The xylene soluble polymer was determined by adding the polymer to heated xylene at approximately 125° C. and determining the amount of polymer dissolving therein. The propylene soluble polymer was determined by measuring the polymer dissolved in the propylene diluent after the diluent is removed from the reactor and evaporated.

SPECIFIC EXAMPLES

EXAMPLE I

Catalyst component 1 consisting of magnesium chloride and titanium tetrachloride was prepared by charging 25 g of magnesium chloride (previously dried 6 hours at 800° F. (426° C.) and ball milled 24 hours in a vibrating mill) and 1.04 g of titanium tetrachloride to a 250 ml spherical stainless steel vessel containing about 400 g of ⅜-inch (0.95 cm) stainless steel balls. The vessel was placed on a vibrating mill and the mixture milled for 24 hours at ambient pressure and temperature. The product had a calculated titanium tetrachloride content of 4.0 wt. %, the balance being magnesium chloride. Suitable amounts of component 1 were used in each of the following runs.

In the following polymerization runs, a dry, air-free, 1 gallon (3.8 liter) stirred, stainless steel reactor was generally charged under a propylene vapor flush with the cocatalyst, catalyst, about 0.9 liter hydrogen (STP) and about 3 liters of liquid propylene. Sufficient liquid propylene was additionally charged so that a liquid full reactor at the reaction temperature of 150° F. (66° C.) resulted. More specific details are presented later. Polymerization was allowed to take place for 1 hour at 150° F. with intermittent addition of propylene as required to maintain a liquid full condition. The reactor and contents were than cooled to about 70° F. (21° C.), 10 cc of methanol were added and mixed with the contents after which the mixture was drained into a receiver. The solid polymer was isolated and dried at ambient conditions.

Calculated productivity is given in terms of grams polymer produced per gram titanium per hour and in grams polymer produced per gram catalyst component 1 per hour. The triethylaluminum/ethyl anisate (TEA/EA) mole ratio in each run of this example was 2.85:1.

In a control run, run 1, the reactor, at about 150° F., was charged under a gaseous propylene flush with EA, TEA, catalyst component 1, hydrogen and liquid propylene in that order. After the reactor and its contents reached 150° F. the polymerization run was started. TEA was added as a 14 wt. % solution in n-hexane.

In invention run 2, the reactor at about 70° F. was charged under a gaseous propylene flush with diethylaluminum chloride (DEAC), EA, TEA as a 14 wt. % solution in n-hexane, catalyst component 1, hydrogen and about 3 liters of liquid propylene in that order. The reactor and its contents were brought to 150° F. with sufficient propylene added to obtain liquid-full conditions. The polymerization time was 1 hour at 150° F. with intermittent addition of propylene as required to maintain a liquid-full condition.

Invention run 3 was a repeat of run 2 using the same charging procedure, etc.

Quantities of reactants, atom ratios of Al/Ti and results obtained are given in the following Table I below.

TABLE I

| | | | | | | | | | | | | | | |
|---|---|---|---|---|---|---|---|---|---|---|---|---|---|---|
| | | | | | | | | | | Propylene Polymerization | | | | |
| Run No. | Catalyst Component I (milliatoms) | | Cocatalyst Components (millimoles) | | | Atom Ratios | | Polymer Yield | Xylene Insoluble Polymer | Propylene Soluble Polymer | Calculated Productivity | | Solubles, wt. T | |
| | mg | Ti | TEA | EA | DEAC | Al$^1$/Ti | Al$^2$/Ti | g | g | g | g/g Ti | g/g Catalyst | Xylene | Propylene |
| 1 | 104.1 | 0.0055 | 6.10 | 2.14 | 0 | 1110 | na$^3$ | 102 | 96 | 10 | 96,900 | 980 | 5.6 | 9.0 |
| 2 | 115.5 | 0.0061 | 6.10 | 2.14 | 1.48 | 1000 | 243 | 245 | 230 | 16 | 210,000 | 2120 | 6.3 | 6.1 |
| 3 | 89.5 | 0.0047 | 6.10 | 2.14 | 1.48 | 1300 | 315 | 175 | 163 | 14 | 193,000 | 1960 | 6.9 | 7.4 |

$^1$Aluminum from TEA
$^2$Aluminum from DEAC
$^3$Not applicable

Inspection of the results reveals that the catalyst of the present invention produces about twice as much polymer per unit time as the catalyst system containing no DEAC used in the control run, run 1.

EXAMPLE II

The effect of the presence of diethylaluminum chloride (DEAC), a compound representative of the fourth component of the catalyst system, and the use of a Lewis base, EB, in the first component was demonstrated in a series of runs in which propylene was polymerized to a solid polymer in batch runs utilizing a catalyst system prepared from magnesium chloride (MgCl$_2$), titanium tetrachloride (TiCl$_4$), triethylaluminum (TEA), ethyl benzoate (EB), ethyl anisate (EA), and durene.

The first component of the catalyst system was prepared by ball milling 5.0 g MgCl$_2$, 5.0 g durene, 2.7 g of a 1:1 molar yellow complex of TiCl$_4$ and EB in a 1-quart bottle filled with 550 g of ⅜-inch SS balls. The MgCl$_2$ had previously been ball-milled by itself and dried at 300° C. The mixture was ball milled for three days at room temperature then passed through a 100 mesh U.S. sieve series screen.

A mixture of the second component and the third component of the catalyst system was prepared by mixing 45 cc hexane, 0.44 cc (0.48 g) EA and 0.82 g (7.4 cc of hexane solution) of TEA.

In a run made without the fourth component a 1-liter stirred autoclave was flushed with nitrogen then charged with 0.1297 g of the above-prepared first catalyst component, and the above-described solution of the second and third catalyst components. The charging was carried out under a gaseous propylene flush. About 200 g liquid propylene was then added together with 1 liter (STP) of hydrogen. The reactor and contents were then heated to 140° F. (60° C.) and additional liquid propylene was added intermittently to maintain the reactor in a liquid full condition. After one hour, the reactor contents were discharged, washed with methanol and dried under vacuum.

In the same manner as in the above run, other runs were carried out except that small amounts of DEAC were added to the reactor prior to the addition of the first, second and third catalyst components.

The results of the above runs are shown in Table II.

The data in Table II show the unexpected benefits obtained by the presence of DEAC in the polymerization zone. Run 1 is a control run showing the results obtained in a DEAC-free system. In run 2, a portion of the TEA in the second catalyst component was replaced with DEAC and resulted in a small change in productivity and an increase in xylene solubles. In run 3 when the TEA was completely replaced by DEAC in the second catalyst component, the productivity fell drastically while the solubles jumped again. Thus, there appeared to be little or nothing to gain by replacing some or all of the TEA by DEAC.

In run 4, however, when a small amount of DEAC was added to the reaction zone while maintaining the desired TEA/EA ratio, a very large increase in productivity was unexpectedly obtained along with only a modest increase in solubles. The data indicate that the DEAC is by no means the equivalent of TEA in this system and that the DEAC very likely functions in a manner at least partially different from the reducing function of the TEA.

Because the reactor was very full of polymer at the completion of the one hour run in run 4, the total amount of catalyst was reduced in invention runs 5 and 6 to provide opportunity for still greater productivity and to improve temperature control.

hours. A mixture of the second and third catalyst components was prepared by mixing appropriate amounts of hexane solutions of TEA and EB.

A 1-liter stirred autoclave, free of air or moisture, was charged with: the first component of the catalyst; a hexane solution of DEAC (when used); a 50 cc hexane flush; the appropriate amounts of the mixture of the second and third components; about 0.5 liter of hydrogen measured at standard conditions (STP); and about ½ liter of liquid propylene. The reactor and contents were heated to 140° F. (60° C.) and additional liquid propylene was added intermittently to maintain a liquid-full condition. After one hour, the reactor contents were discharged, washed with methanol and dried under vacuum. Table III shows the essential conditions and results of these runs.

TABLE III

Polymerization of Propylene

| Run No. | Molar Ratio TEA/EB | TEA/Ti | DEAC/Ti | Xylene Productivity g/g Ti | Solubles wt % |
|---|---|---|---|---|---|
| 1 | 3 | 96 | 0 | 107,000 | 7.4 |
| 2 | 3 | 96 | 96 | 129,000$^c$ | 10.2 |
| 3 | 3 | 96 | 96 | 207,000$^d$ | 10.7 |
| 4 | 3 | 96 | 42 | 172,000$^e$ | 8.9 |
| 5 | 3 | 96 | 42 | 163,000 | 10.6 |
| 6 | 3 | 97 | 42 | 201,000 | 16.6 |
| 7 | 3 | 95 | 42 | 147,000$^b$ | 14.4 |
| 8 | 3 | 96 | 42$^a$ | 174,000 | 13.9 |

Notes:
$^a$The DEAC was mixed with the TEA and EB before being introduced into the reactor. In all other runs, the DEAC preceded the TEA-EB mixture.
$^b$This run at 130° F. All others at 140° F.
$^c$Experienced overheating of reactor up to 175° F.
$^d$Experienced brief fluctuation (130–147° F.).
$^e$Experienced loss of temperature control (120–160° F.).

The data in Table II again show that the presence of DEAC in the polymerization system significantly increases the production of useful solid polypropylene with generally modest increases in the solubles. Inventive Runs 2–8 also illustrate two additional modes of DEAC addition. In one mode of addition the DEAC

TABLE II

Polymerization of Propylene

| Run No | First Catalyst Component (mmoles Ti) | Second Catalyst Component (mmoles) DEAC$^b$ | TEA | Third Catalyst Component (mmoles) EA | Fourth Catalyst Component Added$^a$ DEAC (mmoles) | Productivity g/g Ti | Xylene Solubles Wt % |
|---|---|---|---|---|---|---|---|
| 1 | 0.081 | 0 | 7.2 | 2.7 | 0 | 26,400 | 3.7 |
| 2 | 0.079 | 3.7 | 3.6 | 2.7 | 0 | 29,800 | 5.9 |
| 3 | 0.082 | 7.6 | 0 | 2.7 | 0 | 6,000 | 7.4 |
| 4 | 0.074 | 0 | 7.2 | 2.7 | 3.8 | 61,300 | 7.9 |
| 5 | 0.045 | 0 | 4.0 | 1.5 | 2.3 | 65,000 | 10.3 |
| 6 | 0.038 | 0 | 3.5 | 1.3 | 0.9 | 68,300 | 8.5 |

Notes:
$^a$Added to reactor before other catalyst components with no prior contact with EA.
$^b$The DEAC indicated by this column was used as part or all of the second component of the catalyst system and is not to be confused with the DEAC added to the catalyst as the fourth component.

EXAMPLE III

In another series of runs, propylene was polymerized both in the presence and absence of DEAC under conditions different from those of Example II. In these runs, ethylbenzoate (EB) was used to complex both the TiCl$_4$ and the TEA.

The first component of the catalyst system was prepared by milling 10 g MgCl$_2$, 2.8 g TiCl$_4$, 2.2 g EB and 10 g durene in a 250 cc high energy mill (Vibratom) containing 200 g of ⅜-inch SS balls for a total of 73.5 was introduced into the reaction zone immediately following the introduction of the first catalyst component, and in the other mode of addition the DEAC was premixed with the TEA and EB (second and third catalyst components) at room temperature prior to injection into the reaction zone as in Run 8.

EXAMPLE IV

In another series of runs, propylene was polymerized using the invention process under still different conditions including different modes of addition of catalyst components to the reaction zone. The first catalyst component was prepared in a manner similar to that described in Example III. The second and third catalyst components consisted of triethylaluminum (TEA) and ethyl anisate (EA), respectively. The runs were carried out in a one-gallon autoclave but otherwise in a manner similar to that of Example III. The reaction temperature in the one-hour runs was 150° F. (66° C.) and 900 cc of hydrogen at STP were present in each run. The other essential conditions and results of these runs are shown in Table IV.

The data in Table IV still further illustrates the beneficial effects obtainable from the incorporation of DEAC in the polymerization zone. Also, different modes of contacting the catalyst components are shown.

Specifically, invention run 2 can be compared with control run 1; invention run 4 with control run 3; invention run 6 with control run 5; and invention run 8 with control run 7. In each instance, the presence of DEAC is seen to substantially increase the productivity, with little or no increase in undesirable solubles.

Run 10 compared with run 9 illustrates the advantage of maintaining a relatively low temperature when the first catalyst component is contacted with DEAC in the absence of the second and third catalyst components.

TABLE IV

| | | | Polymerization of Propylene | | |
|---|---|---|---|---|---|
| Run No. | Molar Ratio | | Productivity | Xylene Solubles | Charge Order of Catalyst Components |
| | TEA/EA | TEA/Ti | DEAC/Ti | g/g Ti | wt % | |
| 1 | 1.8 | 62 | 0 | 36,000$^a$ | 6.3 | Mixed first, second and third components ambient temperature and charged mixture to reactor at 140° F. |
| 2 | 1.8 | 47 | 67 | 150,000 | 8.3 | Charged first component, DEAC$^b$, $C_3^=$$^c$, then mixture of second and third components flushed in with $C_3^=$. |
| 3 | 1.6 | 54 | 0 | 30,400 | 11.5 | Charged all compounds (pre-mixed at ambient temperature) to reactor at 150° F. |
| 4 | 1.6 | 57 | 75 | 79,000 | 8.7 | Same as above |
| 5 | 2.8 | 86 | 0 | 115,000 | 5.5 | Charged first component, then flushed in mixture of second and third components with $C_3^=$. |
| 6 | 2.8 | 99 | 14 | 174,000 | 8.1 | Charged first component DEAC, some $C_3^=$, then mixture second and third components. |
| 7 | 2.8 | 79 | 0 | 91,000 | 4.8 | Charged mixture of second and third components, some $C_3^=$, flush in first component. |
| 8 | 2.8 | 91 | 24 | 115,000 | 4.8 | Same as above except mixture of second and third components premixed with DEAC. |
| 9 | 2.8 | 109 | 80 | 65,000 | 8.8 | Charged DEAC, first component, second component, third component at 150° F. |
| 10 | 2.8 | 106 | 41 | 201,000 | 6.5 | Charged DEAC, first component, some $C_3^=$, at 80° F. then mixture of second and third components with $C_3^=$, at 130° F. |

Notes:
$^a$This run at 140° F. All others at 150° F.
$^b$DEAC in this and subsequent runs when used is the fourth catalyst component.
$^c$$C_3^=$ is used to denote liquid propylene.

That which is claimed is:

1. A catalyst which forms on mixing:
   a first component resulting from the admixture of a halogenated tetravalent titanium compound, and a compound selected from the group consisting of magnesium and manganese dihalide;
   a second component wherein said second component is a compound selected from the group consisting of a trialkylaluminum compound and an organoaluminum compound having two or more aluminum atoms bonded to one another by an oxygen or a nitrogen atom;
   a third component wherein said third component is a Lewis base; and
   a fourth component wherein said fourth component is an organoaluminum monohalide represented by the general formula $AlR_2X$ wherein the R groups represent alkyl radicals having from 1 to about 12 carbon atoms, said R groups being the same or different, and X represents a halogen atom;
   wherein the mole ratio of the second component to the Lewis base of the third component ranges from about 1.5:1 to about 6.0:1, wherein the molar ratio of the aluminum compound of the second component to the titanium compound ranges from about 25:1 to about 1500:1 and wherein the molar ratio of the aluminum compound of the fourth component to the titanium compound ranges from about 2:1 to about 1500:1.

2. The catalyst of claim 1 wherein
   titanium tetrahalide and magnesium dihalide are admixed to form said first component;
   said second component is a trialkyaluminum compound with alkyl groups having from 1 to about 12 carbon atoms and the alkyl groups are the same or different;
   wherein the Lewis base for said third component is selected from the group consisting of amines, amides, ethers, esters, ketones, nitriles and phosphines; and
   said fourth component is selected from the group consisting of organoaluminum monochloride and organoaluminum monobromide.

3. The catalyst of claim 1 wherein the first component further comprises a Lewis base.

4. The catalyst of claim 2 wherein the first component further comprises a Lewis base selected from the group consisting of amines, amides, ethers, esters, ketones, nitriles and phosphines, and said Lewis base for the first and third components is the same or different.

5. The catalyst of claim 4 wherein
titanium tetrachloride and magnesium dichloride are admixed to form said first component;
said second component is a trialkylaluminum compound selected from the group consisting of triethylaluminum, trimethylaluminum, tri-n-propylaluminum, triisobutylaluminum, tri(2-ethylhexyl)aluminum, dimethylethylaluminum, tri-n-amylaluminum, tri-n-dodecylaluminum, and mixtures thereof;
wherein the Lewis base for said first component and said third component is an ester represented by the formula

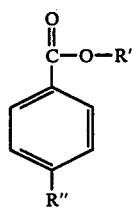

wherein R' represents alkyl groups having from 1 to about 4 carbon atoms and R" represents monovalent radicals selected from the group consisting of —F, —Cl, —Br, —I, —OH, —OR', —OOCR', —SH, —NH$_2$, —NR'$_2$, —NHCOR', NO$_2$, —CN, —CHO, —COR', —COOR', —CONH$_2$, CONR'$_2$, —SO$_2$R', —CF$_3$, and hydrogen; and
said fourth component is an organoaluminum monochloride.

6. The catalyst of claim 5 wherein the Lewis bases are selected from the group consisting of ethyl benzoate, ethyl anisate, ethyl p-dimethylaminobenzoate, ethyl p-fluorobenzoate, ethyl p-cyanobenzoate, methylbenzoate, isopropyl p-diethylaminobenzoate, butyl p-fluorobenzoate, n-propyl-p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate and mixtures thereof and the fourth component is diethylaluminum chloride.

7. The catalyst of claim 1 further including a solid organic material which is inert to the catalyst components and which is added to the catalyst as a part of said first component.

8. The catalyst of claim 3 further including a solid organic material which is inert to the catalyst components and which is added to the catalyst as a part of said first component.

9. The catalyst of claim 3 further including a solid organic material selected from the group consisting of low molecular weight and polymeric materials which is inert to the catalyst components and which is added to the catalyst as a part of said first component.

10. The catalyst of claim 5 further including a solid organic material selected from the group consisting of durene, anthracene, hexachlorobenzene, p-dichlorobenzene, naphthalene, polyvinyltoluene, polycarbonate, polyethylene, polypropylene, polystyrene, polymethylmethacrylate and mixtures thereof.

11. The catalyst of claim 1 wherein
said first component results from the admixture of titanium tetrachloride, magnesium dichloride;
said second component is triethylaluminum;
said third component is ethyl anisate; and
said fourth component is diethylaluminum chloride.

12. The catalyst of claim 8 wherein
said first component results from the admixture of titanium tetrachloride, magnesium dichloride, ethyl benzoate and durene;
said second component is triethylaluminum;
said third component is ethyl anisate; and
said fourth component is diethylaluminum chloride.

13. A catalyst which forms on mixing:
a first component resulting from the admixture of a halogenated tetravalent titanium compound, and a compound selected from the group consisting of magnesium and manganese dihalide wherein the halogenated tetravalent titanium compound and the compounds selected from the group consisting of magnesium and manganese dihalide are admixed by mixing said compounds in a grinding means;
a second component wherein said second component is a compound selected from the group consisting of a trialkylaluminum compound and an organoaluminum compound having two or more aluminum atoms bonded to one another by an oxygen or a nitrogen atom;
a third component wherein said third component is a Lewis base; and
a fourth component wherein said fourth component is an organoaluminum monohalide represented by the general formula AlR$_2$X wherein the R groups represent alkyl radicals having from 1 to about 12 carbon atoms, said R groups being the same or different, and X represents a halogen atom;
wherein the mole ratio of the second component to the Lewis base the third component ranges from about 1.5:1 to about 6.0:1, wherein the molar ratio of the aluminum compound of the second component to the titanium compound ranges from about 25:1 to about 1500:1 and wherein the molar ratio of the aluminum compound of the fourth component to the titanium compound ranges from about 2:1 to about 1500:1.

14. A process comprising:
polymerizing alpha-olefins under polymerization conditions employing a catalyst which forms on mixing:
a first component resulting from the admixture of a halogenated tetravalent titanium compound, and a compound selected from the group consisting of magnesium and manganese dihalide;
a second component wherein said second component is a compound selected from the group consisting of a trialkylaluminum compound and an organoaluminum compound having two or more aluminum atoms bonded to one another by an oxygen or a nitrogen atom;
a third component wherein said third component is a Lewis base; and
a fourth component wherein said fourth component is an organoaluminum monohalide represented by the general formula AlR$_2$X wherein the R groups represent alkyl radicals having from 1 to about 12 carbon atoms, said R groups being the same or different, and X represents a halogen atom;
wherein the mole ratio of the second component to the Lewis base of the third component ranges from about 1.5:1 to about 6.0:1, wherein the molar ratio of the aluminum compound of the second component to the titanium compound ranges from about 25:1 to about 1500:1 and wherein the molar ratio of the aluminum compound of the fourth component to the titanium compound ranges from about 2:1 to about 1500:1.

15. The process of claim 14 wherein
said alpha-olefins have from about 2 to about 6 carbon atoms per molecule;
titanium tetrahalide and magnesium dihalide are admixed to form said first component;
said second component of said catalyst is a trialkylaluminum compound with alkyl groups having from 1 to about 12 carbon atoms and the alkyl groups are the same or different;
wherein the Lewis base for said third component is selected from the group consisting of amines, amides, ethers, esters, ketones, nitriles and phosphines; and
said fourth component of said catalyst is selected from the group consisting of organoaluminum monochloride and organoaluminum monobromide.

16. The process of claim 14 wherein the first component further comprises a Lewis base.

17. The process of claim 15 wherein the first component further comprises a Lewis base selected from the group consisting of amines, amides, ethers, esters, ketones, nitriles and phosphines, and said Lewis base for the first and third components is the same or different.

18. The process of claim 17 wherein
titanium tetrachloride and magnesium dichloride are admixed to form said first component;
said second component of said catalyst is a trialkylaluminum compound selected from the group consisting of triethylaluminum, trimethylaluminum, tri-n-propylaluminum, triisobutylaluminum, tri(2-ethylhexyl)aluminum, dimethylethylaluminum, tri-n-amylaluminum, tri-n-dodecylaluminum, and mixtures thereof;
wherein the Lewis base for said first component and said third component is an ester represented by the formula

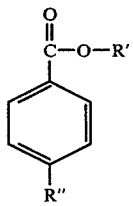

wherein R' represents alkyl groups having from 1 to about 4 carbon atoms and R" represents monovalent radicals selected from the group consisting of —F, —Cl, —Br, —I, —OH, —OR', —OOCR', —SH, —NH$_2$, —NR'$_2$, —NHCOR', NO$_2$, —CN, —CHO, —COR', —COOR', —CONH$_2$, CONR'$_2$, —SO$_2$R', —CF$_3$, and hydrogen; and
said fourth component of said catalyst is an organoaluminum monochloride.

19. The process of claim 18 wherein the Lewis bases are selected from the group consisting of ethyl benzoate, ethyl anisate, ethyl p-dimethylaminobenzoate, ethyl p-fluorobenzoate, ethyl p-cyanobenzoate, methylbenzoate, isopropyl p-diethylaminobenzoate, butyl p-fluorobenzoate, n-propyl-p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate and mixtures thereof and the fourth component is diethylaluminum chloride.

20. The process of claim 14 wherein said catalyst further includes a solid organic material which is inert to the catalyst components and which is added to the catalyst as a part of said first component.

21. The process of claim 16 wherein said catalyst further includes a solid organic material which is inert to the catalyst components and which is added to the catalyst as a part of said first component.

22. The process of claim 16 wherein the catalyst further includes a solid organic material selected from the group consisting of low molecular weight and polymeric materials which is inert to the catalyst components and which is added to the catalyst as a part of said first component.

23. The process of claim 17 wherein the catalyst further includes a solid organic material selected from the group consisting of durene, anthracene, hexachlorobenzene, p-dichlorobenzene, napthalene, polyvinyltoluene, polycarbonate, polyethylene, polypropylene, polystyrene, polymethylmethacrylate and mixtures thereof.

24. The process of claim 14 wherein
said alpha-olefin is propylene;
said first component of said catalyst results from the admixture of titanium tetrachloride, magnesium dichloride;
said second component of said catalyst is triethylaluminum;
said third component is ethyl anisate; and
said fourth component is diethylaluminum chloride.

25. The process of claim 16 wherein
said alpha-olefin is propylene;
said first component of said catalyst results from the admixture of titanium tetrachloride, magnesium dichloride, ethyl benzoate and durene;
said second component of said catalyst is triethylaluminum;
said third component is ethyl anisate; and
said fourth component is diethylaluminum chloride.

26. A process comprising:
polymerizing alpha-olefins under polymerization conditions employing a catalyst which forms on mixing:
a first component resulting from the admixture of a halogentated tetravalent titanium compound, and a compound selected from the group consisting of magnesium and manganese dihalide wherein the halogenated tetravalent titanium compound and the compounds selected from the group consisting of magnesium and manganese dihalide are admixed by mixing said compounds in a grinding means;
a second component wherein said second component is a compound selected from the group consisting of a trialkylaluminum compound and an organoaluminum compound having two or more aluminum atoms bonded to one another by an oxygen or a nitrogen atom;
a third component wherein said third component is a Lewis base; and
a fourth component wherein said fourth component is an organoaluminum monohalide represented by the general formula AlR$_2$X wherein the R groups represent alkyl radicals having from 1 to about 12 carbon atoms, said R groups being the same or different, and X represents a halogen atom;

wherein the mole ratio of the second component to the Lewis base of the third component ranges from about 1.5:1 to about 6.0:1, wherein the molar ratio of the aluminum compound of the second component to the titanium compound ranges from about 25:1 to about 1500:1 and wherein the molar ratio of the aluminum compound of the fourth component to the titanium compound ranges from about 2:1 to about 1500:1.

* * * * *

UNITED STATES PATENT AND TRADEMARK OFFICE
CERTIFICATE OF CORRECTION

PATENT NO. : 4,234,710
DATED : November 18, 1980
INVENTOR(S) : Charles W. Moberly et al It is certified that error appears in the above-identified patent and that said Letters Patent are hereby corrected as shown below:

Column 14, line 37, after "base" insert --- of ---.

Signed and Sealed this

Twenty-fourth Day of March 1981

[SEAL]

Attest:

RENE D. TEGTMEYER

Attesting Officer     Acting Commissioner of Patents and Trademarks